Feb. 23, 1937.　　　　S. N. HURT　　　　2,071,404
WEIGHING SCALE
Filed Jan. 29, 1936　　　2 Sheets-Sheet 1
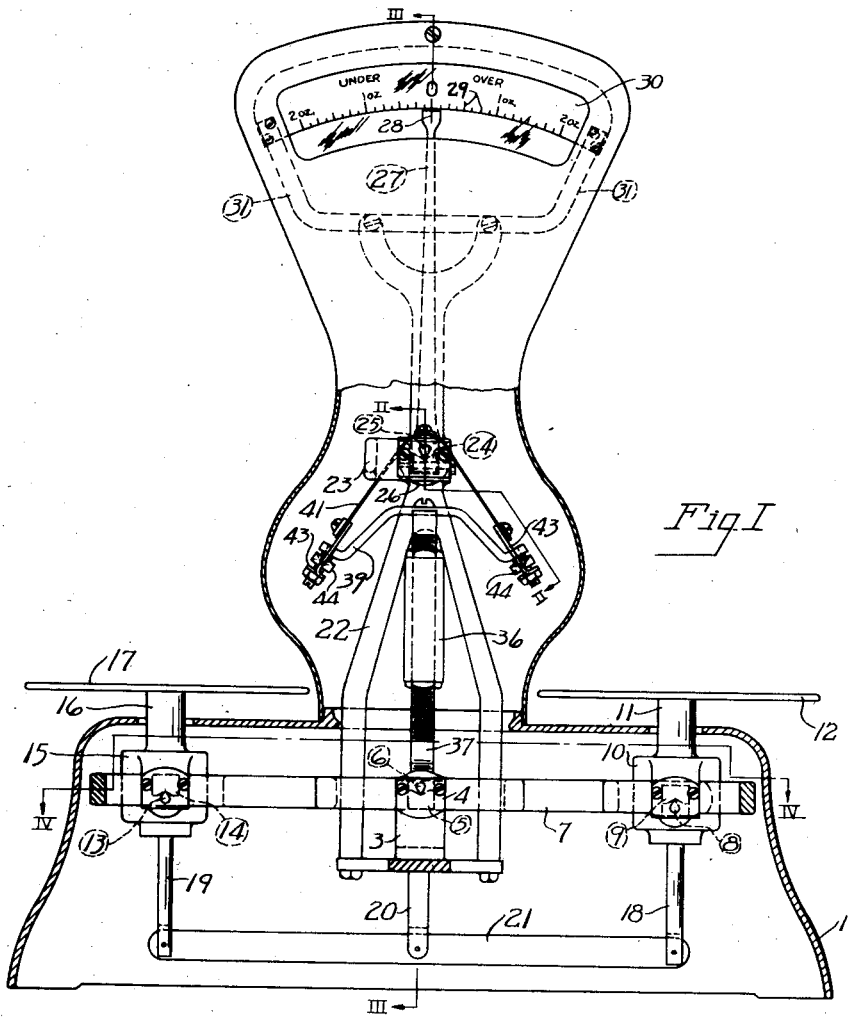
Fig. I
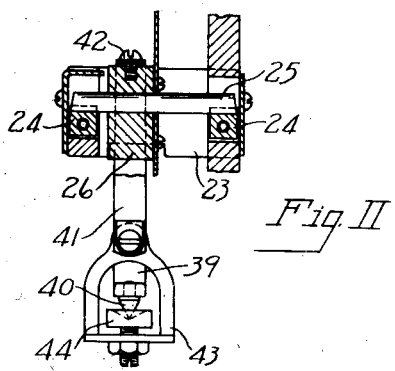
Fig. II
Samuel N. Hurt
INVENTOR
ATTORNEY Feb. 23, 1937. S. N. HURT 2,071,404
WEIGHING SCALE
Filed Jan. 29, 1936 2 Sheets-Sheet 2
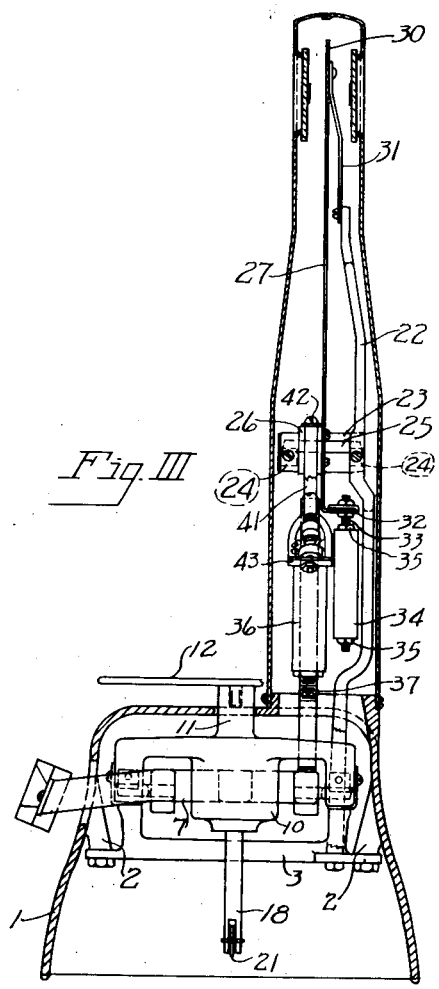
Fig. III
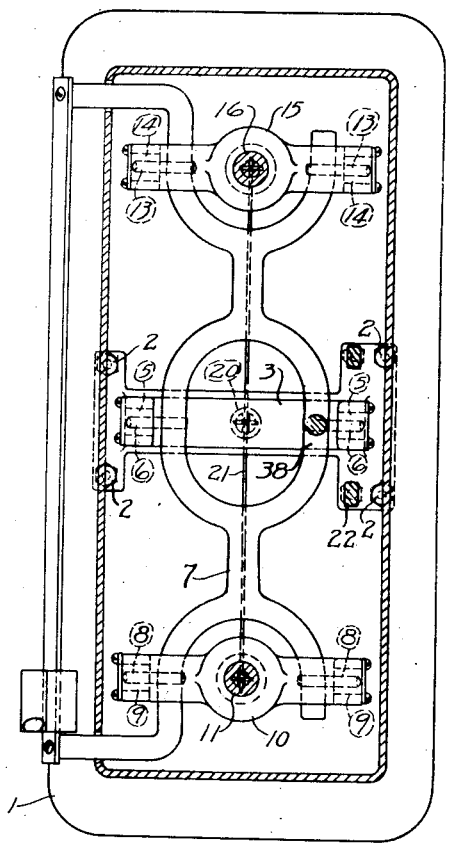
Fig. IV
Samuel N. Hurt
INVENTOR
BY *Marshall*
ATTORNEY Patented Feb. 23, 1937

2,071,404

UNITED STATES PATENT OFFICE 2,071,404

WEIGHING SCALE

Samuel N. Hurt, Toledo, Ohio, assignor to Toledo Scale Manufacturing Company, Toledo, Ohio, a corporation of New Jersey Application January 29, 1936, Serial No. 61,267

6 Claims. (Cl. 265—59)

This invention relates generally to weighing scales, and more particularly to an improved weighing scale which is adapted to be moved about readily and which requires no leveling operation prior to its operation.

The principal object of my invention is the provision of improved means for obviating inaccurate weight indications when the scale is in a somewhat unlevel position.

Another object is the provision in a weighing scale, the combination of a pendulum and an antipendulum.

Still another object of the invention is the provision of improved means for converting a small angular movement of a scale member into a comparatively large movement of an indicator.

These, and other objects and advantages will be apparent from the following description in which reference is had to the accompanying drawings wherein similar reference characters refer to similar parts throughout the several views.

In the drawings:—

Figure I is a front elevational view of the improved scale, parts being broken away to more clearly show the mechanism.

Figure II is a fragmentary sectional view of the driving connection between the load receiving mechanism and the indicating mechanism sectioned substantially along the line II—II of Figure I.

Figure III is a transverse sectional view through the scale, the section being substantially along the line III—III of Figure I; and, Figure IV is a plan sectional view substantially along the line IV—IV of Figure I.

Referring to the drawings in detail:—

The scale comprises a base 1, preferably a rigid metallic casting which is provided with inwardly extending bosses 2 to which a fulcrum bracket 3 is securely bolted. Upstanding portions 4 of this bracket are provided with V bearings 5 which form seats for fulcrum pivots 6 extending transversely from an even armed lever 7. In spaced relation to the fulcrum pivot 6, adjacent one end of the lever is a pair of load pivots 8 which support bearings 9 of a load receiver frame 10. A cylindrical portion 11 of this load receiver frame 10, which extends through an aperture of the base 1, is surmounted by platter 12 for the reception of the commodity to be weighed. Adjacent the opposite end of the lever is a pair of counterpoise pivots 13 which in a similar manner support bearings 14 of a counterpoise frame 15, and to a portion 16, which also extends through an aperture in the base, a counterpoise platter 17 is fastened. To maintain the condition of level of the load platter 12 and the counterpoise 17 check posts 18 and 19 are respectively fixed, in a depending position, in the load platter frame 10 and counterpoise frame 15. Another check post 20 is dependingly fixed in the fulcrum bracket 3. A check link 21 pivotally engages these posts and serves to guide the aforementioned platters in the manner well known in scale construction.

To support counterbalancing and indicating mechanisms a frame 22 is bolted to the fulcrum bracket 3 and extends through an opening in the top of the base 1. This arrangement of securing the frame 22 to the bracket 3 obviates a possible displacement of the axes of the load counterbalancing mechanism and of the lever. It is desirable that they lie in the same vertical plane. A bracket 23 is bolted to the frame 22 and projects horizontally over the lever 7. Furcated portions of this bracket 23 form seats for a pair of bearings 24, upon which rests a pendulum pivot 25, forming the fulcrum, of a load counterbalancing pendulum. This pivot 25 extends through and is fastened in a cylindrical member 26, to which an indicator 27 is fastened. This indicator 27 terminates in a spade-like portion which is provided with an index character 28 for cooperation with graduations 29 on a chart 30 to indicate the condition of balance of the scale. The chart 30 is secured to branches 31 of the frame 22. The indicator and the chart are so designed and arranged that they lie in one plane thus obviating reading errors caused by parallax.

For convenience and simplicity in constructing the load counterbalancing pendulum, the lower end 32 of the indicator 27 is turned at right angles to its body and folded upon itself as a reinforcement and a pendulum stem 33 is clamped to the reinforced end 32 on which a pendulum weight 34 is threaded, lock nuts 35 are provided to retain the weight 34 in adjusted position.

For a purpose, which will hereinafter become clear, an antipendulum weight 36 is adjustably threaded on a stem 37 which is studded into a horizontal, transversely extending arm 38 of the lever 7. A bow-shaped yoke 39, which forms a portion of the means for connecting the lever mechanism to the pendulum, is rigidly fastened to the upper end of the stem 37. The ends of this yoke are bent substantially at a right angle to the arms of the yoke and cone pivots 40 are fixed in the ends in such position that an extension of the longitudinal axis of the cone pivots are tangent to the periphery of the cylindrical member 26 to which the indicator 27 is secured.

A connection between the yoke 39, which forms a part of the lever mechanism, and the indicating mechanism, is provided by a flexible metallic ribbon 41 which passes over the periphery of the cylindrical member 26 to which it is clamped by means of the screw 42. The ends of this ribbon 41 are fastened to stirrups 43 (see Figure II) provided with bearings 44 having conical seats which are engaged by the cone pivots 40 and serve, in cooperation with the ribbon 41, to transmit movement of the lever 7 to the indicator in a substantially frictionless manner. For the purpose of adjusting the ribbon 41 to the correct tension, the bearings 44 are provided with stems which are threaded through portions of the stirrups 43.

An even balance beam scale, having a load or counterpoise receiver mounted at each end, is in equilibrium and will weigh substantially correct even when the support on which it is standing is somewhat out of level. When, however, a load counterbalancing pendulum is operatively connected to the beam, even the slightest longitudinal out of level position of the scale results in an incorrect indication of the weight, due to the fact that gravity exerts a pull on the center of mass of the pendulum weight in a direction vertical to the horizon thus effecting the equilibrium of the lever. To obviate such errors the antipendulum weight 36 on the stem 37 is provided. When, for example, the scale which embodies my invention is placed on a counter which slopes toward one end, for example, it is assumed that the right end of the scale (facing the chart) is somewhat higher than the left end. The pendulum weight will swing into a position on the left side of a line passing through its fulcrum pivot and the indicator will point to one of the graduations 29 on the "over side" of the chart. When the antipendulum weight however is mounted on the lever, as hereinbefore described, it also will have a tendency to swing towards the left of the aforementioned line and cooperating with the yoke 39, stirrup 43 and the ribbon 41, exert a force on the cylindrical member 26 in the opposite direction; therefore, counteracting the unbalanced force which causes the inaccurate indicator position. It is, of course, necessary that the pendulum weight 34 and the antipendulum weight 36 are so designed and adjusted that their weight moments are equal. This, however, is within the knowledge of everyone versed in the scale art and it is, therefore, deemed unnecessary to provide mathematical formulae.

It will be seen that the information herein described and illustrated is well adapted to fulfill the objects primarily stated. It is to be understood, however, that the information is susceptible to variation, modification and change within the spirit and scope of the subjoined claims.

Having described my invention, I claim:

1. In a device of the class described, in combination, weighing mechanism comprising an even armed lever, load and counterpoise receptacles pivotally mounted on opposite ends of said lever, a load counterbalancing pendulum mounted above and independently of said lever, means for operatively connecting said lever to said load counterbalancing pendulum, said connecting means including an antipendulum adjustably mounted on said lever, said antipendulum being adapted to act in opposition to said load counterbalancing pendulum when the vertical axis of said device is not in coincidence with a line which is vertical to the horizon.

2. In a device of the class described, in combination, weighing mechanism including a lever, load counterbalancing mechanism comprising a pendulum, means for connecting said lever to said load counterbalancing mechanism, said means comprising a yoke rigidly secured to said lever, a metallic ribbon operatively connecting said yoke to said pendulum and an antipendulum adjustably secured to said yoke, the weight moment of said antipendulum acting in opposition to said pendulum when the vertical axis of said weighing mechanism is displaced from a line which is vertical to the horizon.

3. In a device of the class described, in combination, weighing mechanism, said weighing mechanism including a lever, load receiving means pivotally secured to said lever, automatic load counterbalancing mechanism comprising a pendulum for determining the amount of a load on said load receiver, means for operatively connecting said lever to said pendulum, said means including yoke-like member, conical pivots secured in opposite ends of said yoke-like member and flexible metallic means secured to said pendulum and having stirrups for pivotally engaging said conical pivots in said yoke-like member.

4. In a device of the class described, in combination, weighing mechanism including a bracket, a lever oscillatably mounted thereon, an upwardly extending frame secured thereto, a load counterbalancing pendulum pivoted on said upwardly extending frame, an antipendulum fixed to said lever, connecting means between said pendulum and said antipendulum, and said pendulum and said antipendulum being adapted to swing in planes parallel to each other and parallel to the longitudinal axis of said lever.

5. In a device of the class described, in combination, weighing mechanism including a bracket, a lever oscillatably mounted thereon, an upwardly extending frame secured thereto, a load counterbalancing pendulum pivoted on said upwardly extending frame, an antipendulum fixed to said lever, connecting means between said pendulum and said antipendulum, said pendulum and said antipendulum being adapted to swing in planes parallel to each other and parallel to the longitudinal axis of said lever and substantially in the same horizontal plane.

6. In a device of the class described, in combination, weighing mechanism comprising load receiving means, load counterbalancing and load indicating means cooperating therewith, said load receiving means comprising a fulcrum bracket, a lever pivoted on said bracket, load receiving means on said lever, said load counterbalancing means comprising a pendulum and an antipendulum mounted independently of each other, connecting means between said pendulum and said antipendulum whereby movement of said pendulum is influenced by movement of said antipendulum and said indicating means being adapted to indicate the movement of said pendulum as modified by the movement of said antipendulum.

SAMUEL N. HURT.